H. E. BRADLEY.
ELECTRIC TOASTER.
APPLICATION FILED FEB. 25, 1909.
926,714.
Patented June 29, 1909.
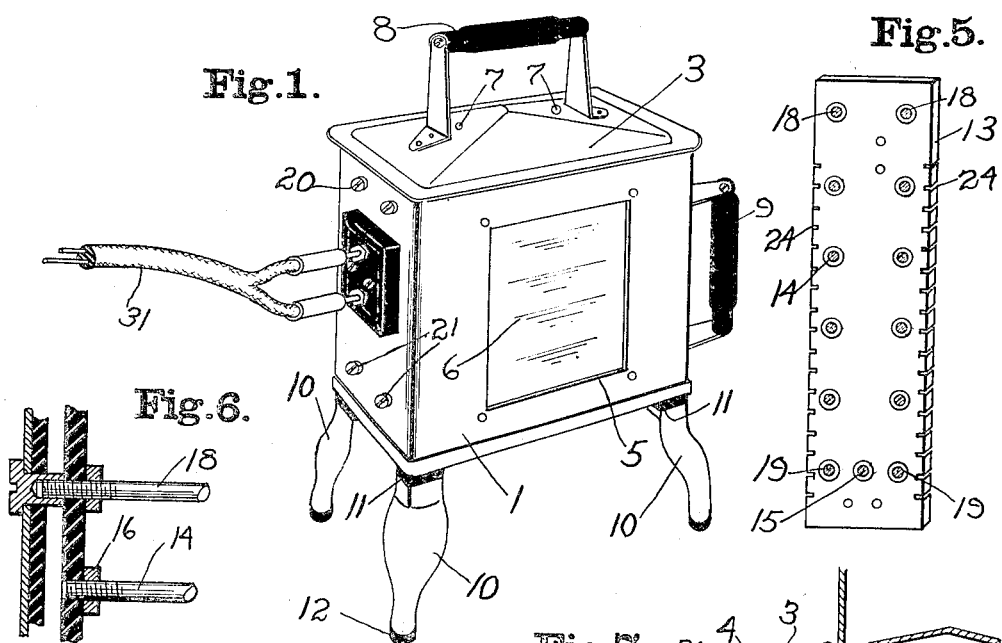
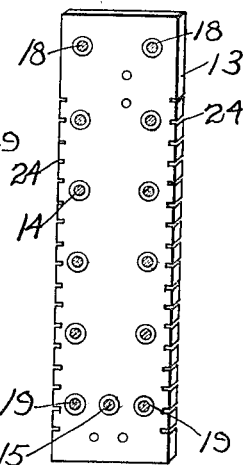
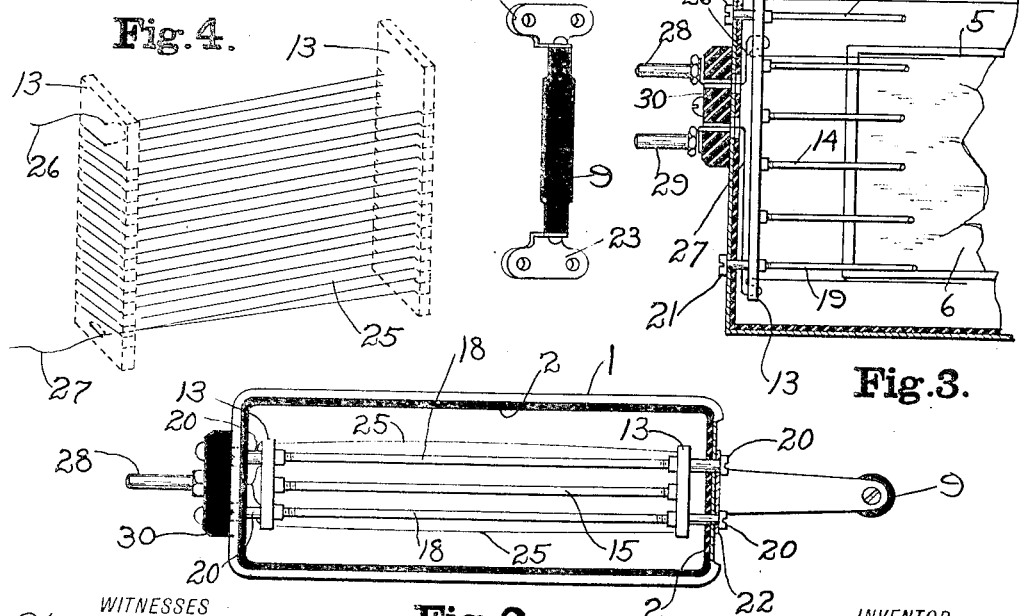
WITNESSES
Willard S. Bardsley.
E. D. Ogden
INVENTOR
Harold E. Bradley.
BY Howard E. Barlow
ATTORNEY

UNITED STATES PATENT OFFICE.

HAROLD E. BRADLEY, OF APPONAUG, RHODE ISLAND.

ELECTRIC TOASTER.

No. 926,714.　　　Specification of Letters Patent.　　　Patented June 29, 1909.

Application filed February 25, 1909. Serial No. 479,938.

*To all whom it may concern:*

Be it known that I, HAROLD E. BRADLEY, a citizen of the United States, residing at Apponaug, in the county of Kent and State of Rhode Island, have invented certain new and useful Improvements in Electric Toasters, of which the following is a specification, reference being had herein to the accompanying drawing.

This invention relates to electric toasters and has for its object to provide a portable toaster adapted to be quickly heated by an electric current, the same to be very attractive, neat and compact in appearance, of inexpensive construction and efficient in its operation.

In carrying out my invention I provide a casing provided with a removable cover and a heating element located in the casing and formed of a continuous resistance wire wound around or about a bread receiving rack in such a manner as to heat both sides of the bread simultaneously and so arranged that none of the crumbs can fall on the wires to clog or affect their heating capacity. The ends of said wire are then electrically connected to suitable terminals on the casing which lead to a suitable source of supply by a flexible cord.

An essential feature of my improved toaster is that the casing is provided with one or more windows through which the condition of the bread may be observed while toasting.

Another feature of the device is that the same is provided with supporting legs that are separated from the heated body or casing by heat insulating material, whereby the toaster may be operated upon a polished table without injuring the same.

With these and other objects in view, the invention consists of certain novel features of construction, as will be more fully described and particularly pointed out in the appended claims.

In the accompanying drawings: Figure 1—is a perspective view of my improved toaster and showing the electric connection thereto. Fig. 2—is a plan view of the toaster with the cover removed. Fig. 3—shows a portion of the device with the case in section. Fig. 4—is a diagrammatic view showing the winding of the heating wire. Fig. 5—is a face view of one of the end plates of the bread rack. Fig. 6—is an enlarged view showing a portion of one of the rack end plates and the means by which said rack is retained in the casing. Fig. 7—is a rear view of the casing handle showing the construction by which it is retained in position on the casing.

Referring to the drawings, 1 designates the casing which may be constructed of sheet metal, or any desired material and nickel-plated, or otherwise finished, to present an attractive appearance and yet uninjured by the heat. This casing is preferably made in a rectangular form, open at its top, and large enough to inclose a heating rack of a size adapted to receive a slice of bread, the interior surface of this casing being lined as at 2 with asbestos, or other suitable heat insulating material. An essential feature of this construction is that apertures 5 are formed in the two opposite sides of the casing, and mica 6, or other suitable heat resisting transparent material set therein so that the condition of the bread while toasting may be readily observed. The top of this casing is provided with a cover 3, which has a downwardly projecting flange 4, see Fig. 3, all around it adapted to extend on the inside of the casing to hold the same in position thereon. This cover is provided with holes 7—7 to vent the interior while the bread is toasting, and the cover is also provided with a handle 8 constructed of wood, or other heat insulating material. A similar handle 9 is also provided for the casing so that said cover may be removed and the casing manipulated while heated, without fear of burning the hand of the operator. As the handles are made of wood or fiber they also serve as an electric insulator to protect the hand from receiving an electric shock should the wires for any reason become short circuited through the casing. This casing is mounted on four legs 10—10 which may be made of metal, if desired, but which are separated at 11 from the metal of the casing by a packing of heat insulating material to prevent said legs from becoming heated. The lower ends or feet 12 are also constructed of a similar material so as to effectually prevent the slightest injury to the table on which it may sit even when the toaster is heated and in full operation.

The bread rack is formed of two narrow end plates 13—13 of electrical insulating material, the same being perforated with two rows of small holes spaced apart, as indicated at Fig. 5, said holes being for the purpose of receiving the ends of rods 14, thereby forming two rows of grid bars, said rows being spaced apart sufficient to receive a slice of bread edgewise between them. A bar 15 is located in the center between the rows and at the lower end thereof to form a stop upon which the lower edge of the slice of bread may rest. These bars are preferably formed of small rods which may be threaded on their ends, if desired, as at 16, see Fig. 6, and are held in position in said holes by nuts or shoulders 17—17 formed at either end on the inside of the plate. In order to secure this rack in position in the casing the two upper rods 18—18 and the two lower rods 19—19 are made slightly longer than the others for the purpose of receiving elongated shoulder nuts 20 and 21 which extend through the casing at either end of the plate. These shoulder nuts 20 and 21 which fit onto the rear ends of said rods 18 and 19 are also adapted to be passed through ears 22 and 23, see Fig. 7, in the handle 9, to also secure the same in position on the casing. By the use of these shoulder nuts the heating rack may be readily removed and replaced by a heating element of a different voltage whereby this toaster may be readily changed and adapted to operate on circuits of different potentials. The edges of the two end plates 13—13 are notched at close intervals at 24—24 on either edge to receive the heating resistance wire 25 which is preferably formed of one continuous integral piece and wound in a continuous coil around both of these plates just outside of the bars or rods, and inserted into the notches whereby they will be retained in their relative position to each other and in close proximity without touching the slice of toast deposited in the space between the rods and within the coil, whereby the heat from the wires is adapted to act simultaneously to toast both sides of the slice. As many coils or turns of this wire are made as are found necessary to generate the requisite amount of heat for toasting the bread in a predetermined number of seconds, and these coils are electrically insulated from each other by means of the insulating material of which the end plates are constructed. After the bread rack has been thus constructed it is readily placed in position within the casing and the two ends of the wire 26 and 27 are connected to the terminals 28 and 29, which are supported in the insulating block 30 on the casing, the toaster then being connected to a source of current through the flexible cord 31.

In the operation of my improved toaster the same may be electrically connected by a flexible cord to any lamp socket and placed on the serving table, or any other convenient place, without fear of injuring the linen or finish of the table. The cover, owing to the insulated handle, may be readily removed when the casing is heated, and a slice of bread dropped edgewise between the rows of rods in the rack. The cover is then replaced, thereby retaining the heat within the casing, said heat being sufficient to toast the bread to a satisfactory degree within a few seconds.

An essential feature of my improved device is that the progress of the toasting may be readily observed through the windows in the sides, the incandescent wires within lighting up the interior to such an extent that the condition of the bread may be readily noted, and when the same is finished satisfactorily the cover is taken off and the bread easily removed, by any suitable means, or the bread may be dropped out by lifting the toaster by the handle and turning it up-side-down.

I do not restrict myself to a toaster adapted to operate upon a single slice of bread at a time, as the casing may be made as wide as desired and any number of rows and wires may be employed to toast as many slices at a time as may be desired.

Another feature of this construction is the bread is dropped in edgewise from the top and the wires instead of being underneath are arranged on either side thereof, in which position they are most effective, as none of the crumbs from the bread can fall upon these wires to insulate them or in any way lessen their heating effectiveness.

My improved toaster is very light in weight, compact in form and easy to manipulate. It is also ornamental and attractive in appearance and effective in its operation.

Having thus described my invention, what I claim as new and desire to secure by Letters Patent, is:

1. In an electric toaster, a bread rack formed of rows of bars spaced apart and secured at their ends to plates of electrically insulating material, and an electric resistance wire wound lengthwise around said rack whereby the contents of the same may be heated on opposite sides.

2. In an electric toaster, a bread rack formed of bars spaced apart and set in rows, plates of electrically insulating material to which said bars are secured at their ends, said rack being adapted to receive a slice of bread edgewise therein, and an electric resistance wire wound around said rack whereby the contents of the same may be heated on opposite sides.

3. In a portable electric toaster, the combination of a casing open at its upper end, a removable cover therefor, a bread rack formed of bars spaced apart and adapted to receive a slice of bread edgewise therein, end plates of electrically insulating material to which said bars are secured, a continuous electric heating wire wound around said rack whereby the bread contained therein is cooked on opposite sides simultaneously, said rack being formed independent of said casing and adapted to be inserted and removably secured therein, electric terminals on said casing to which said heating element is connected, and flexible means for connecting said terminals with an electric circuit.

In testimony whereof I affix my signature in presence of two witnesses.

HAROLD E. BRADLEY.

Witnesses:
　HOWARD E. BARLOW,
　E. I. OGDEN.